United States Patent

Kamiyama et al.

[11] Patent Number: 5,085,814
[45] Date of Patent: Feb. 4, 1992

[54] PRODUCTION PROCESS OF EXPANSION-MOLDED ARTICLE

[75] Inventors: Makoto Kamiyama; Shigeo Nakada, both of Kanuma; Kouji Ikeda, Utsunomiya; Hiroshi Usui; Kazutoshi Sasaki, both of Kanuma; Hiroshi Yamamoto, Utsunomiya, all of Japan

[73] Assignee: JSP Corporation, Tokyo, Japan

[21] Appl. No.: 631,094

[22] Filed: Dec. 19, 1990

[30] Foreign Application Priority Data

Dec. 21, 1989 [JP] Japan .................................. 1-331700
Aug. 23, 1990 [JP] Japan .................................. 2-222122

[51] Int. Cl.⁵ ...................... B29C 35/06; B29C 33/04
[52] U.S. Cl. .................................. 264/126; 264/321; 264/335; 425/4 R
[58] Field of Search ......... 264/126, 321, 335, DIG. 7; 425/4 R

[56] References Cited

U.S. PATENT DOCUMENTS

| | | | |
|---|---|---|---|
| 3,255,286 | 6/1966 | Luc-Belmont | 264/126 |
| 3,263,010 | 7/1966 | Shultz | 264/126 |
| 3,823,213 | 7/1974 | Stastny et al. | 264/51 |
| 4,031,179 | 6/1977 | Tatzel jet al. | 264/126 |
| 4,206,166 | 6/1980 | Hayashi et al. | 264/126 |
| 4,333,897 | 6/1982 | Hayashi et al. | 264/40.6 |
| 4,456,573 | 6/1984 | Ragazzini et al. | 264/53 |
| 4,698,191 | 10/1987 | Endo et al. | 264/50 |
| 4,818,451 | 4/1989 | Arai et al. | 264/40.3 |

FOREIGN PATENT DOCUMENTS

| | | | |
|---|---|---|---|
| 623804 | 7/1961 | Canada | 264/DIG. 7 |
| 0212204 | 3/1987 | European Pat. Off. | 264/321 |
| 0279455 | 8/1988 | European Pat. Off. | 264/321 |
| 105941 | 8/1981 | Japan | 264/335 |
| 192545 | 8/1986 | Japan | 264/321 |

Primary Examiner—Mary Lynn Theisen
Attorney, Agent, or Firm—Sherman and Shalloway

[57] ABSTRACT

An expansion-molded article is produced by filling prefoamed thermoplastic particles in a mold cavity formed in combination of mold sections, through each of which plural heating medium holes are defined, and then feeding a heating medium such as steam through the holes to heat and fusion-bond the particles into the article conforming with the mold cavity. Each of the mold sections is covered by a permeable porous sheet at least over the heating medium on a side of the mold cavity.

13 Claims, 2 Drawing Sheets

PRODUCTION PROCESS OF EXPANSION-MOLDED ARTICLE

BACKGROUND OF THE INVENTION

1. Field of the Invention

The present invention relates to a process for the production of an expansion-molded article.

2. Description of the Related Art

It has been known to produce a molded article (so-called expansion-molded article) by filling prefoamed thermoplastic particles in a mold cavity formed by a combination of mold sections, through each of which plural heating medium holes are defined, and then heating the thus-filled particles with a heating medium such as steam to fusion-bond them into the article conforming with the mold cavity. In the mold employed upon production of the molded article, the heating medium holes which may hereinafter also be called "steam holes" are generally formed by fitting parts, which define plural slits or small bores permitting passage of steam therethrough and are called "core vents", in through-holes formed in the mold. Construction of such steam holes by fitting removable parts such as core vents in the through-holes of the mold is needed because the resin tends to stick in the steam holes and hence to cause clogging of the steam holes as molding is repeated. When the steam holes are clogged, the construction of the steam holes by removable parts such as core vents permits elimination of the clogged resin after removing the core vents from the mold. This assures better workability than the elimination of clogging of steam holes when the steam holes are formed directly in a mold.

Use of such core vents is however still accompanied by a serious problem in the efficiency of production as the core vents must be removed from the mold usually every 7,000–10,000 shots (at intervals of 20–30 days for industrial scale production) and then heated to 200°–300° C. to fuse off the resin clogging the steam holes of the core vents and the molding work has to be halted during this period. Further, many core vents each of which has plural steam bores are distributed on the surface of a mold. Numerous marks of these steam bores of the core vents are therefore remain on the surface of the resulting molded article, leading to another problem such that the commercial value of the molded article is reduced.

SUMMARY OF THE INVENTION

With the foregoing in view, an object of the present invention is to provide a process for the production of an expansion-molded article, which process is free of the drawbacks of the conventional art.

In one aspect of the present invention, there is thus provided a process for producing an expansion-molded article by filling prefoamed thermoplastic particles in a mold cavity formed in combination of mold sections through each of which plural heating medium holes are defined, and then feeding a heating medium such as steam through the holes to heat and fusion-bond the particles into the article conforming with the mold cavity. Each of the mold sections is covered by a permeable porous sheet (16) at least over the heating medium holes on a side of the mold cavity.

According to the process of the present invention, the heating medium such as steam is fed upon molding, thereby eliminating the potential problem of clogging of the heating medium holes with the molten resin. It is therefore no longer required to halt the molding work to remove the resin clogging the heating medium holes, whereby the efficiency of production of molded articles can be improved, the cumbersome work for the removal of the clogging resin is no longer required, and molded articles can be produced with high efficiency. Further, the covering of the heating medium holes by the porous sheet has eliminated the inherent problem that marks are transferred onto the surface of each molded article from the heating medium holes and remain there, thereby providing the molded article with a high commercial value. When the porous sheet is bonded locally to the mold, the prefoamed particles can be uniformly heated by the heating medium fed into the mold cavity through the heating medium holes. As a result, a further advantage can be brought about such that a molded article formed of thermoplastic particles well fusion-bonded can be obtained.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENTS

Figure 1:
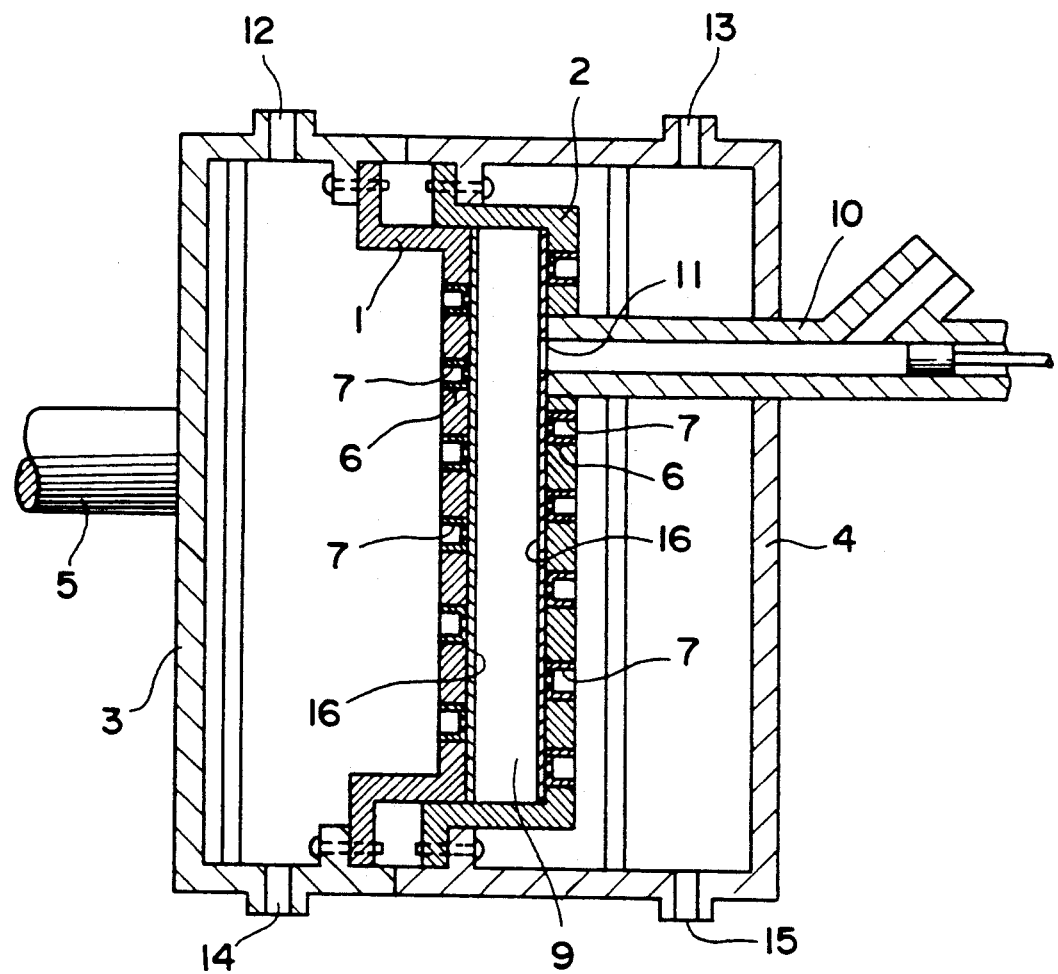
FIG. 1 is a vertical cross-section showing one example of molding apparatus useful in the practice of the present invention.
Figures 2A, 2B, 2C:
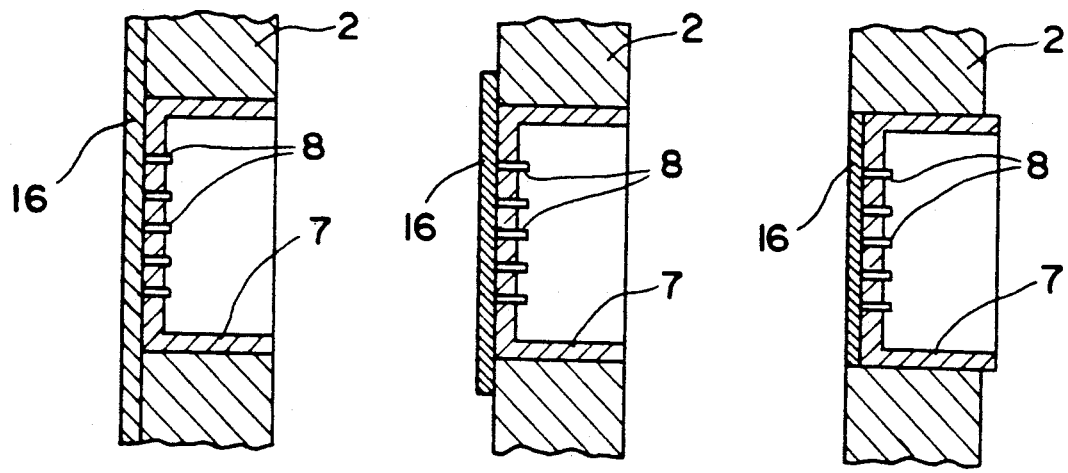
FIGS. 2(a) through 2(c) are vertical cross-sections showing different manners of attachment of a porous sheet.

FIG. 1 illustrates a molding apparatus useful in the practice of the process of this invention, in which numerals 1,2 indicate mold sections. The mold sections 1,2 are fixed on frames 3,4, respectively. The frame 3 is connected to a piston rod 5 of an unillustrated hydraulic cylinder or the like so that the frame 3 can be slidably reciprocated. By slidable reciprocation of the frame 3, the mold sections 1,2 are selectively opened or closed. Each of the mold sections 1,2 defines a number of through-holes 6. A core vent 7 is fitted in each through-hole 6. As is shown in FIGS. 2(a) through 2(c), plural heating medium holes 8 are formed in each core vent 7 so that prefoamed thermoplastic particles filled into a mold cavity 9 through a feed port 11 of a prefoamed particle feeder 10 are heated by a heating medium such as steam supplied through the heating medium holes 8. In the drawing, numerals 12,13 indicate inlets for the heating medium such as steam or for cooling water, while numerals 14,15 designates outlets for the heating medium such as steam or for cooling water.

In the present invention, each of the mold sections 1,2 is covered by a permeable porous sheet 16 at least over the heating medium holes (i.e., the core vents 7) on a side of the mold cavity. Any porous sheet can be used as the porous sheet 16 insofar as the porous sheet has permeability to such extent that a heating medium such as steam or air is allowed to pass therethrough and the porous sheet is made of a heat-resistant material resistant to deterioration by the heat of the heating medium. However, to prevent penetration of a resin fused by the heating medium, the porous sheet may preferably have an average pore size of from 10 Å to 100 μm, especially of 1-100 μm. Illustrative of the heat-resistant material for the porous sheet 16 may include heat-resistant polymers such as polytetrafluoroethylene, polyethylene terephthalate, polybutylene terephthalate, polyamides, polyarylates, polysulfones, polyethersulfones, polyetherimides, polyamide-imides, polyphenylenesulfides, polyethere-therketones and polyoxybenzoates. They can be used either singly or in combination. Of these heat-resistant polymers, polytetrafluoroethylene, polyethylene terephthalate and polybutylene terephthalate are preferred for their excellent mold releasability. The porous sheet 16 useful in the practice of the process of the present invention can be obtained, for example, by the process disclosed in Japanese Patent Application Laid-Open No. 176549/1989 or by stretching a sheet which has been formed by incorporating at least 35 wt. %, especially 35-70 wt. % of an inorganic filler in the above-described polymer. To form a porous sheet by stretching a sheet containing an inorganic filler, it is only necessary to form the above inorganic-filler-containing polymer into a sheet-like configuration and then to stretch the resultant sheet by conventional uniaxial or biaxial orientation. Although not necessarily limited to any particular method, this stretching can be performed by using a method such that an area draw ratio of 1.5 times or greater, preferably in the range of from 2 to 6 times can be achieved at a temperature not higher than the softening point. When a sheet containing 35 wt. % or more of an inorganic filler is stretched, spacings are formed between the polymer matrix and the inorganic filler, and these spacings are eventually caused to expand into small pores so that a porous sheet is obtained. Examples of the above inorganic filler may include metal oxides, hydroxides and salts, which generally have an average particle size of 0.1-100 μm, most preferably about 0.5-20 μm. Described more specifically, calcium oxide, alumina, silica and the like can be mentioned as metal oxides; aluminum hydroxide, calcium hydroxide and the like as hydroxides; calcium carbonate, magnesium chloride, basic magnesium carbonate, calcium sulfate, magnesium sulfate, aluminum sulfate and the like as salts. In addition, calcium silicates, cements, zeolites, and clays such as talc can also be used.

Also usable as a preferred porous sheet in the present invention is a woven fabric which has been formed by processing the above-described heat-resistant polymer into threads having a diameter of 1-70 μm and weaving the threads with the above-described pores formed between the threads.

The porous sheet 16 preferably has a thickness of 5-100 μm.

Among porous sheets made of the heat-resistant polymers described above, porous sheets making use of polytetrafluoroethylene by way of example are commercially available under the trade name of "MICROTEX NFT-5220" from NITTO DENKO CORPORATION, Osaka, Japan.

The porous sheet 16 can be provided to cover the entire surface of each mold section on a side of the mold cavity as illustrated in FIG. 2(a). In this case, the porous sheet 16 defines a hole only at a portion opposing the feed port 11 for prefoamed particles or a separate porous sheet may be provided. As an alternative, the porous sheet 16 can be provided to cover only the core vents 7 and their peripheral surface areas of the mold section as depicted in FIG. 2(b). Although no specifically illustrated in any drawing, the porous sheet 16 can be provided to cover the entire inner wall of the mold cavity 9. In this case, the feed port 11 for prefoamed particles is also left uncovered or a separate porous sheet may also be attached to a free end of a piston. Since a thin porous sheet is used as the porous sheet 16, there is not a big chance that a mark could be left on a molded article due to the thickness of the porous sheet 16 even when only a part of the inner wall of each mold section is covered by the porous sheet 16 as illustrated in FIG. 2(b). It is however preferable to fit each core vent 7 in a manner indented from the inner wall of the corresponding mold section by the distance equal to the thickness of the porous sheet 16 and then to cover the inner end of the core vent with the porous sheet 16 as shown in FIG. 2(c), because this arrangement can substantially obviate possible formation of marks on the molded article due to the thickness of the porous sheet 16.

An adhesive is used upon attachment of the porous sheet 16 to the cavity-side surface of each of the mold sections 1,2. An adhesive excellent in heat resistance should be used as the adhesive. Illustrative adhesives having excellent heat resistance may include mixed adhesives such as those of the phenolic/vinyl, phenolic/nitrile, phenolic/neoprene, epoxy/phenolic, epoxy/polyamide, epoxy/polysulfide, epoxy/silicone and nitrile rubber/epoxy type, epoxy resin adhesives, phenoxy resin adhesives, polysulfone resin adhesives, polyallylsulfone resin adhesives, silicone resin adhesives, polyamideimide adhesives, and polyimide adhesives.

Upon bonding the porous sheet 16 onto at least a cavity-side surface, in which the heating medium holes are formed, of each mold section with the above-described heat-resistant adhesive, the adhesive can coated onto the entire surface of the porous sheet and/or the whole area of the cavity-side surface. As an alternative, the adhesive can be locally coated for bonding the porous sheet. When the porous sheet is locally bonded with the adhesive, the heating medium supplied through the heating medium holes is allowed to flow in a greater proportion in the direction of the surface of the porous sheet compared to the porous sheet bonded after the entire surface of the porous sheet and/or the whole area of the cavity-side surface has been coated with the adhesive. This makes it possible to uniformly distribute the heating medium in the mold cavity, whereby uniform heating can be carried out and a good molded article free of inter-particle voids can thus be obtained even with steam of lower pressure.

When the adhesive is locally coated, it is preferable to use the adhesive in such a way that the total area of the adhesive accounts for 1-30% of the surface area of one side of the porous sheet. To locally bond the porous sheet with the adhesive, the adhesive can be applied in various shapes such as lines or spots. In general, it is preferable to bond with the adhesive coated in the form of spots distributed at predetermined intervals such that the area of the adhesive is 0.01-10 $cm^2$ per spot and the total area of the spots of the adhesive accounts for 1-30% as described above. Here, it is necessary to pay attention to apply the adhesive without complete closure of the heating medium holes. From this viewpoint, it is preferable to provide the adhesive not to locate near the heating medium holes, especially to assume substantially the midpoint between each heating medium hole and its adjacent heating medium hole.

A mold section with a porous sheet locally bonded on at least a cavity-side surface, in which heating medium holes are formed, can be formed by locally coating the porous sheet and/or the cavity-side surface with a tacky or hot-melt adhesive composed of the above-described adhesive and the pressing the porous sheet against the particular cavity-side surface (in the case of the hot-melt adhesive, in a state that the adhesive is heated and fused). When the adhesive is coated to the porous sheet and/or the cavity-side surface, the coated thickness of the adhesive may preferably be 3–50 μm.

Where a tacky adhesive is used as the adhesive for bonding the porous sheet, it is preferable it be in the form of a double-tack tape. Where a hot-melt adhesive is used and a woven fabric is employed as the porous sheet, it is possible, as preferred embodiments, to prepare a porous sheet by forming the hot-melt adhesive into plural threads and then weaving them at equal intervals together with threads of a heat-resistant material such as a heat-resistant polymer or by weaving hot-melt-adhesive-coated threads and threads made of a heat-resistant material at a ratio of one of the former threads to several of the latter threads and then to press the porous sheet under heat against the cavity-defining wall of each mold section with an iron or the like so that the porous sheet can be locally bonded to the cavity-defining wall.

As the prefoamed thermoplastic particles usable in the process of the present invention, prefoamed particles made of any resin as a base material can be used as long as the resin is a thermoplastic resin. Usable prefoamed particles include, for example, those made of styrene resins such as polystyrene, poly-p-methyl-styrene, styrene-acrylonitrile copolymers and styrene-maleic anhydride copolymers; olefin resins such as polyethylenes of various densities (high-density polyethylene, low-density polyethylene, low-density linear polyethylene and the like), polypropylene, ethylene-propylene copolymers, ethylene-butene copolymers, propylene-butene copolymers and propylene-ethylene-butene terpolymers; polyvinyl chloride; polyvinylidene chloride; various nylons; and various polyesters.

As the heating medium for heating the prefoamed thermoplastic particles filled in the mold cavity 9, steam is employed usually. The pressure of steam which is used for heating purpose varies depending on the kind of the base resin of the prefoamed particles, the steam permeability of the porous sheet 16, etc. When a porous sheet having a thickness of 5–100 μm and a pore size of from about 10 Å to about 100 μm is used as the porous sheet 16 as described above, the steam pressure can generally be about 0–2 kg/cm$^2$(G) for prefoamed particles made of a styrene resin as a base material and about 0.5–5 kg/cm$^2$(G) for prefoamed particles made of an olefin resin as a base material. The use of mold sections with a porous sheet locally bonded on the cavity-defining walls thereof accordingly makes it possible to lower the molding steam pressure by about 5–20% compared with the conventional method in which mold sections covered with a porous sheet are not used, leading to a reduction in the energy cost.

In the above embodiment, the heating medium holes were formed by fitting the core vents in their corresponding through-holes formed in the core sections. The through-holes formed in the core sections can however be used directly as heating medium holes without fitting core vents therein, because the heating medium holes are covered by a permeable porous sheet in the process of the present invention and there is no chance of clogging of the heating medium holes with a molten resin. Upon release of each molded article from the mold, the molded article can be released by pushing it out with an eject pin as has been practiced conventionally. Where mold release is effected using an eject pin, the porous sheet should include a through-hole for permitting passage of the eject pin. As an alternative, the molded article can also be released by providing, instead of such an eject pin, a device capable of feeding compressed air of 3–15 kg/cm$^2$(G) through the feed port for prefoamed particles and blowing the compressed air against the molded article. In this case, the commercial value of the resulting molded article can be increased further.

The present invention will hereinafter be described in more detail by the following examples.

EXAMPLES 1-4

In each of the examples, an autoclave having 400 l capacity was charged with 220 l of water, 100 kg of the resin particles shown in Table 1 (weight: about 7 mg per particle in Examples 1 and 2, and about 1.8 mg per particle in Examples 3 and 4), the blowing agent of the kind and amount given in Table 1, and 50 g of aluminum oxide. After the inside of the autoclave was heated to the foaming temperature indicated in Table 1, the contents were maintained at that temperature for 20 minutes. A valve provided at the bottom of the autoclave was then opened to release the contents of the autoclave under the atmospheric pressure, whereby prefoamed particles of the expansion ratio shown in Table 1 were obtained.

Those particles were filled in the mold of the production apparatus depicted in FIG. 1. Each mold section had a 900 mm × 1200 mm porous sheet cut out from "MICROTEX NFT-5200" (trade name; product of NITTO DENKO CORPORATION, Osaka, Japan) and bonded with a silicone adhesive on the cavity-side wall thereof at the area where the steam holes were formed. The porous sheet had been bonded by applying the silicone adhesive 5 mm wide along all the four sides of the area of the cavity-side wall of mold section, on which area the porous sheet was to be bonded, and further by successively applying the silicone adhesive as a 2-mm diameter spot at a center of the area of the cavity-side wall and then as 2-mm diameter spots at all the crossing points of imaginary lines extending at intervals of 30 mm in parallel with an imaginary X-axis drawn through the center of the area and further imaginary lines extending at intervals of 30 mm in parallel with an imaginary Y-axis drawn through the center of the area. In addition, a portion of the porous sheet, said portion opposing the feed port for the prefoamed particles, was separated from the remaining portion of the porous sheet. The prefoamed particles thus filled were heated at the molding steam pressure shown in Table 1, whereby a molded article of 900 mm × 1200 mm × 500 mm whose configurations were in conformity with the mold cavity was obtained. With respect to the resultant molded article, its expansion ratio, its ten-points average roughness $R_z$), the presence or absence of marks of the steam holes, and its external appearance are also shown in Table 1. The use of the above mold remained free from resin clogging of the steam holes or the porous sheets at positions corresponding to the locations of the steam holes even after a continuous molding operation was conducted 1,000 cycles, each including all the steps from the filling of prefoamed particles until the release of a resulting molded article.

EXAMPLE 5

A silicone adhesive was coated to the entire surface of an area of a cavity-side wall of each of mold sections similar to those employed in Examples 1–4, in which area steam holes were formed, without closure of the steam holes. A 90-μm thick woven fabric which was formed of polyethylene terephthalate threads having a diameter of about 48 μm and defined interstices of about 50–70 μm wide between the threads was bonded to the area of the cavity-side wall. Prefoamed particles similar to those used in Example 1 were charged in the mold and were heated with 1.7 kg/cm$^2$(G) steam, whereby the prefoamed particles were molded. The mold also remained free from resin clogging of the steam holes or the porous sheets at positions corresponding to the locations of the steam holes even after a 1,000 cycle continuous molding operation.

COMPARATIVE EXAMPLES 1–2

Molded articles were obtained following the procedures of Examples 1 and 3, respectively except that the porous sheets "MICROTEX NFT-5200" were not bonded on the cavity-defining walls of the mold sections. The ten-points average roughness ($R_2$) of each of the resultant molded articles is shown along with the presence or absence of marks of the steam holes and the external appearance in Table 1. The molds developed resin clogging of the steam holes in an about 7,000 cycle continuous molding operation.

Figure 3:
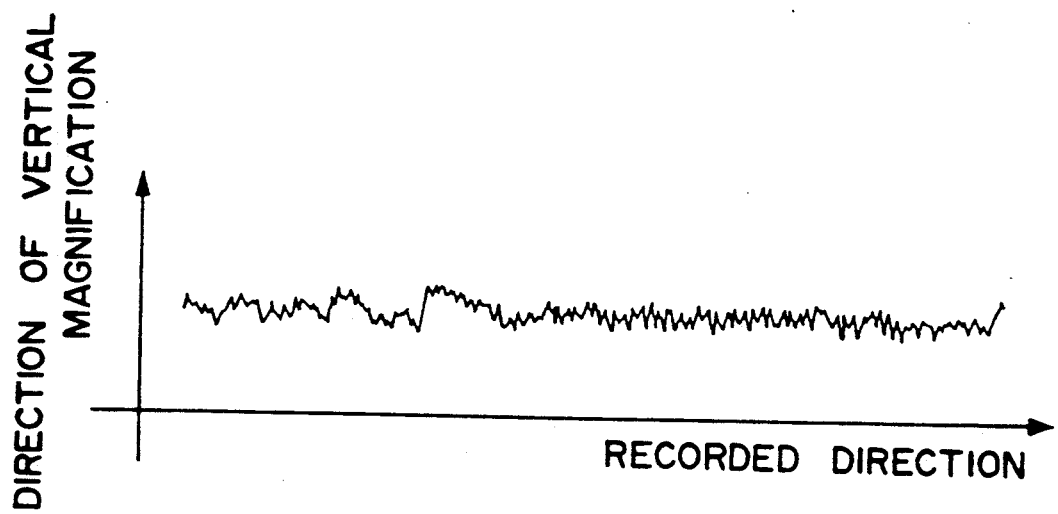
FIG. 3 is a chart illustrating the results of a measurement of the surface roughness of the molded article in Example 1.
Figure 4:
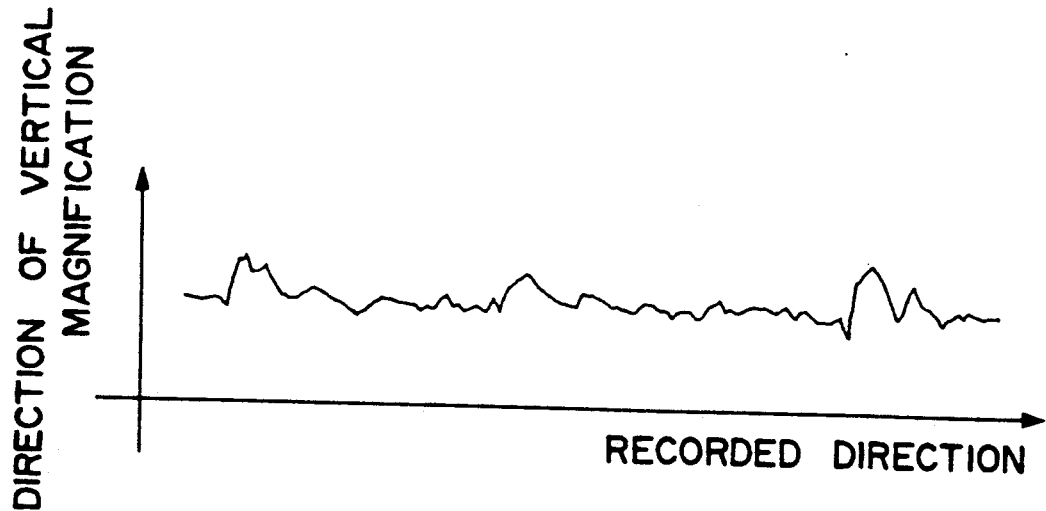
FIG. 4 is a chart depicting the results of a measurement of the surface roughness of the molded article in Comparative Example 1.

The surfaces of the molded articles obtained in Example 1 and Comparative Example 1, respectively were measured by a surface roughness meter ("SURF-CORDER SE-30D", trade name; manufactured by K. K. Kosaka Kenkyusho). Their charts are shown in FIGS. 3 and 4, respectively. In each of FIGS. 3 and 4, the recorded direction is plotted along the axis of abscissas while the vertical magnification is plotted along the axis of ordinates.

Incidentally, the term "ten-points average roughness" as used herein means the average roughness defined in JIS B0601. Further, each measurement by the surface roughness meter was conducted by choosing as a standard length a desired 90 cm long section on a line, which extended through surface portions corresponding to some steam holes, and then measuring the surface roughness along the 90 cm long section under the conditions consisting of 0.8 cutoff value and 2 μm contact feeler tip diameter.

TABLE 1

| | Kind of resin particles | Blowing agent Kind | Blowing agent Amount (kg) | Foaming temperature (°C.) | Bulk expansion ratio of prefoamed particles (times) | Molding steam pressure (kg/cm$^2$·G) |
|---|---|---|---|---|---|---|
| Example | | | | | | |
| 1 | Low-density PE[1] Density: 0.923 g/cm$^3$ Gel content: 53% | DDM[3] | 29 | 117 | 33 | 1.3 |
| 2 | Low-density PE Density: 0.923 g/cm$^3$ Gel content: 53% | DDM | 26.5 | 117 | 19 | 1.3 |
| 3 | P/E random copolymer[2] (Ethylene content: 2.5 wt. %) | DDM[4] + TFM (7:3) | 16.5 | 142 | 18 | 3.5 |
| 4 | P/E random copolymer (Ethylene content: 2.5 wt. %) | DDM + TFM (7:3) | 19.5 | 135 | 34 | 3.5 |
| Comp. Ex. | | | | | | |
| 1 | Low-density PE Density: 0.923 g/cm$^3$ Gel content: 53% | DDM | 29 | 117 | 33 | 1.3 |
| 2 | P/E random copolymer (Ethylene content: 2.5 wt. %) | DDM + TFM (7:3) | 16.5 | 142 | 18 | 3.5 |

| | Kind of resin particles | Molded article Expansion ratio (times) | Molded article Ten-points average roughness $R_2$ (μm) | Molded article Marks of steam holes | Molded article Appearance |
|---|---|---|---|---|---|
| Example | | | | | |
| 1 | Low-density PE[1] Density: 0.923 g/cm$^3$ Gel content: 53% | 29 | 482.7 | None | Good |
| 2 | Low-density PE Density: 0.923 g/cm$^3$ Gel content: 53% | 15 | 405.3 | None | Good |
| 3 | P/E random copolymer[2] (Ethylene content: 2.5 wt. %) | 15 | 459.8 | None | Good |
| 4 | P/E random copolymer (Ethylene content: 2.5 wt. %) | 30 | 530.1 | None | Good |
| Comp. Ex. | | | | | |
| 1 | Low-density PE Density: 0.923 g/cm$^3$ Gel content: 53% | 29 | 828.0 | Formed | Voids formed in resin |
| 2 | P/E random copolymer | 15 | 801.2 | Formed | Voids |

TABLE 1-continued

| (Ethylene content: 2.5 wt. %) | | formed in resin |
|---|---|---|

[1] Low-density PE: low-density polyethylene
[2] P/E random copolymer: propylene-ethylene random copolymer
[3] DDM: dichlorodifluoromethane
[4] DDM + TFM (7:3): dichlorodifluoromethane + trichlorofluoromethane (weight ratio: 7:3)

We claim:

1. A process for producing an expansion-molded article by filling prefoamed thermoplastic particles in a mold cavity formed in combination of mold sections through each of which plural heating medium holes are defined, and then feeding a heating medium through the holes to heat and fusion-bond the particles into the article conforming with the mold cavity, wherein each of the mold sections is covered by a permeable porous sheet having an average pore size of from about 10 Å to 100 nm, at least over the heating medium holes on a side of the mold cavity.

2. The process of claim 1, wherein the heating medium is steam.

3. The process of claim 1, wherein the sheet is locally bonded with a heat-resistant adhesive to a cavity-side wall of each of the mold sections at least over the heating medium holes.

4. The process of any one of claims 1-3, wherein the sheet is made of a polymer selected from the group consisting of polytetrafluoroethylene, polyethylene terephthalate and polybutylene terephthalate.

5. The process of any one of claims 1-3, wherein the sheet is a porous sheet obtained by stretching a synthetic resin sheet, which contains at least 35 wt. % of an inorganic filler, so as to make the synthetic resin sheet porous.

6. The process of any one of claims 1-3, wherein the sheet is a woven fabric made of a heat-resistant polymer in the form of threads having a diameter of 1-70 μm.

7. The process of claim 3, wherein the sheet is a woven fabric formed by weaving a thread-like hot-melt adhesive at equal intervals together with threads made of a heat-resistant polymer and the woven fabric is locally bonded to at least said portion of the cavity-side wall by heating and pressing the woven fabric against at least said portion of the cavity-side wall.

8. The process of claim 3, wherein the sheet is a woven fabric formed by weaving a thread-like heat resistant polymer, which is surface-coated with a hot-melt adhesive, at equal intervals together with threads made of a heat-resistant polymer and the woven fabric is locally bonded to at least said portion of the cavity-side wall by heating and pressing the woven fabric against at least said portion of the cavity-side wall.

9. The process of claim 3, wherein the sheet is locally bonded such that the total area of the adhesive accounts for 1-30% of the surface area of one side of the sheet.

10. The process of claim 3, wherein the sheet is locally bonded by plurality of spots of the adhesive, the area of each spot of the adhesive is 0.01-10 $cm^2$, and the total area of the spots of the adhesive accounts for 5-30% of the surface area of one side of the sheet.

11. The process of claim 1 or 3, wherein the heating medium is steam, the prefoamed thermoplastic particles are basically made of a styrene resin, the sheet has a thickness of 5-100 μm and an average pore size of from 10 Å to 100 μm, and the prefoamed thermoplastic particles are heated and molded with 0-2 $kg/cm^2(G)$ of steam.

12. The process of claim 1 or 3, wherein the heating medium is steam, the prefoamed thermoplastic particles are basically made of an olefin resin, the sheet has a thickness of 5-100 μm and an average pore size of from 10 Å to 100 μm, and the prefoamed thermoplastic particles are heated and molded with 0.5-5 $kg/cm^2(G)$ of steam.

13. The process of claim 1 or 3, wherein the mold sections are opened after the molding, and compressed air of 3-15 $kg/cm^2(G)$ is blown against the molded article through a feed port for the prefoamed thermoplastic particles so that the molded article is separated from the mold sections.

* * * * *